United States Patent [19]

Hamada et al.

[11] Patent Number: 5,299,038

[45] Date of Patent: Mar. 29, 1994

[54] LCD WITH HEAT CONDUCTOR FROM LIGHT SOURCE TO SEPARATE PORTION OF LIGHT GUIDE

[75] Inventors: Hiroshi Hamada; Katuyuki Kanbara; Shuichi Abe, all of Tokyo, Japan

[73] Assignee: Kabushiki Kaisha Toshiba, Kawasaki, Japan

[21] Appl. No.: 826,848

[22] Filed: Jan. 28, 1992

[30] Foreign Application Priority Data

Jan. 28, 1991 [JP] Japan ................. 3-025177

[51] Int. Cl.$^5$ ................. G02F 1/1335; G02F 1/133
[52] U.S. Cl. ................. 359/49; 359/86; 359/50
[58] Field of Search ................. 359/42, 48, 49, 50, 359/62, 43, 86; 362/26, 30, 31

[56] References Cited

U.S. PATENT DOCUMENTS

| 4,206,501 | 6/1980 | Brooks ................. 359/86 |
| 4,634,225 | 1/1987 | Haim et al. ................. 359/86 |
| 4,643,525 | 2/1987 | Haim ................. 359/86 |
| 4,933,814 | 6/1990 | Sanai ................. 362/26 |
| 4,945,349 | 7/1990 | Sanai ................. 359/49 |
| 5,119,215 | 6/1992 | Marks et al. ................. 359/86 |
| 5,146,354 | 9/1992 | Plesinger ................. 362/31 |

FOREIGN PATENT DOCUMENTS

| 55-141183 | 3/1979 | Japan. |
| 58-34113 | 8/1983 | Japan. |
| 60-65723 | 5/1985 | Japan. |

*Primary Examiner*—William L. Sikes
*Assistant Examiner*—Kenneth Parker
*Attorney, Agent, or Firm*—Finnegan, Henderson, Farabow, Garrett & Dunner

[57] ABSTRACT

In an LCD (Liquid Crystal Display) module, a light-guide plate is arranged on a side opposite to a display surface of an LCD panel, and cold-cathode tubes are provided to two sides of the light-guide plate Light generated by the cold-cathode tube is uniformly radiated on the LCD panel through the light-guide plate. The cold-cathode tubes generate heat together with light A panel cover is arranged to prevent heat from dissipating to the outside. Heat is conducted to part or an entire portion of the light-guide plate by using a heat conducting plate or the like

9 Claims, 11 Drawing Sheets

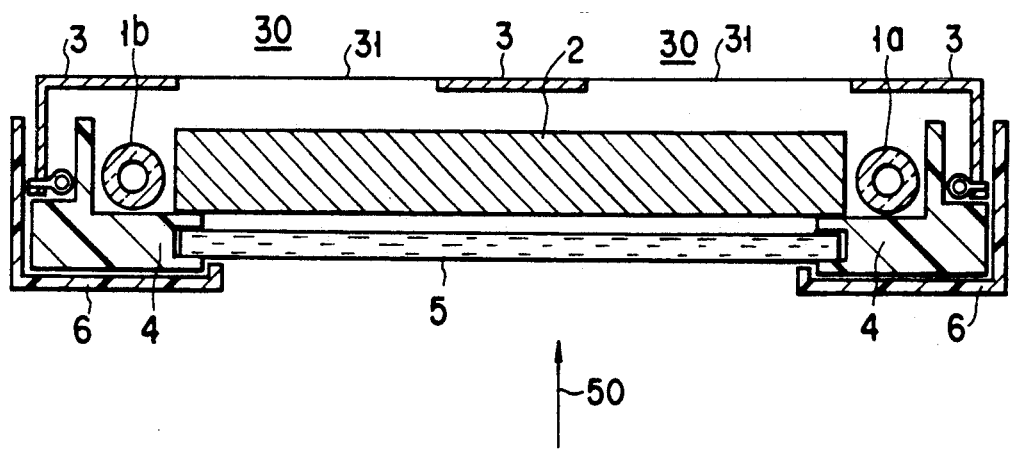
F I G. 3

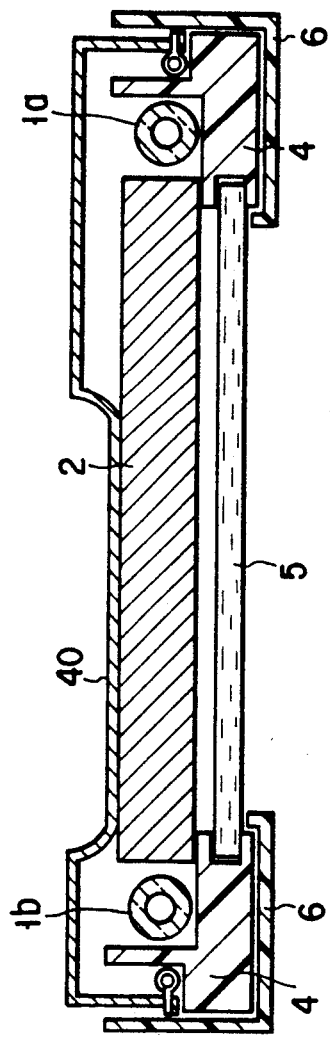
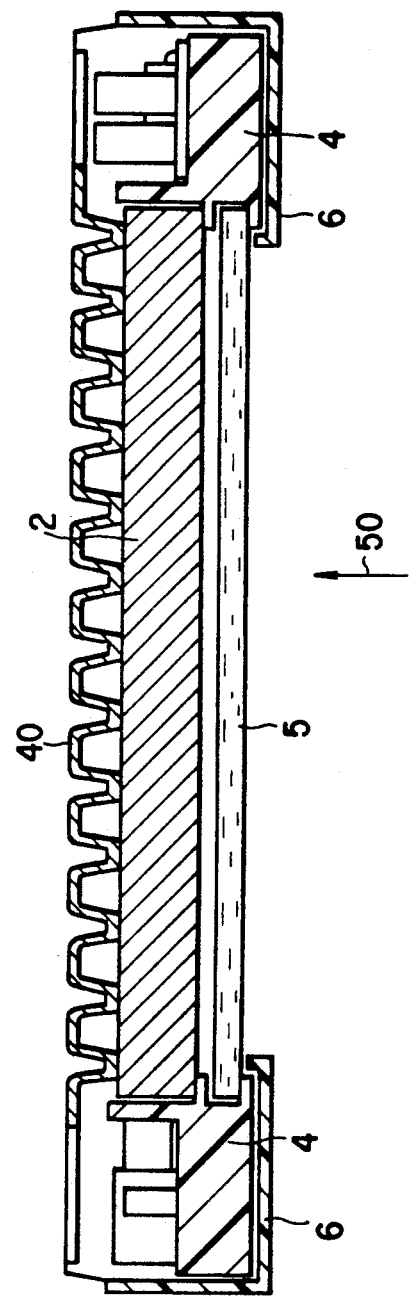

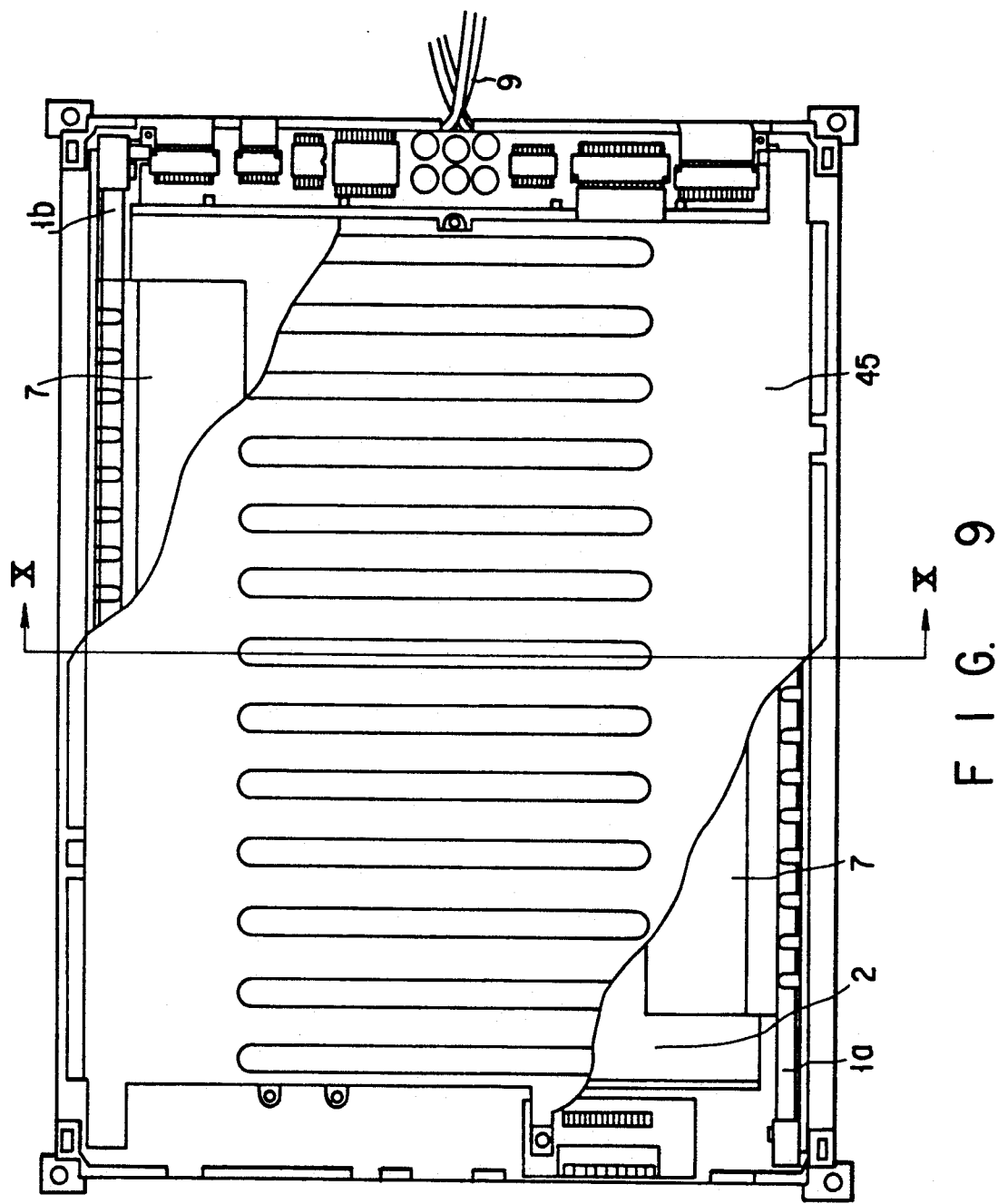

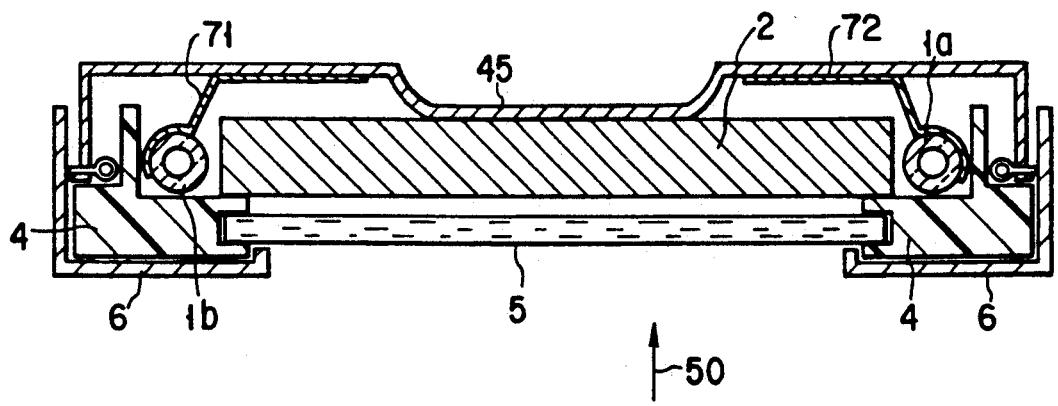
F I G. 10
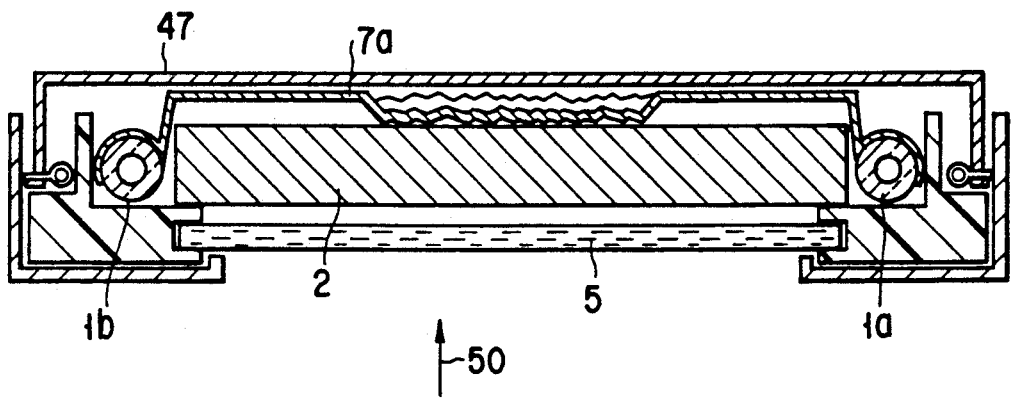
F I G. 11
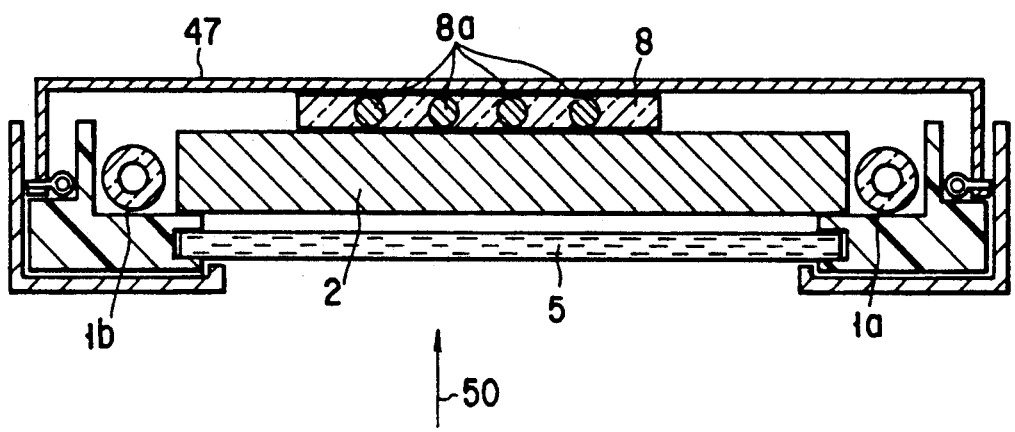
F I G. 12

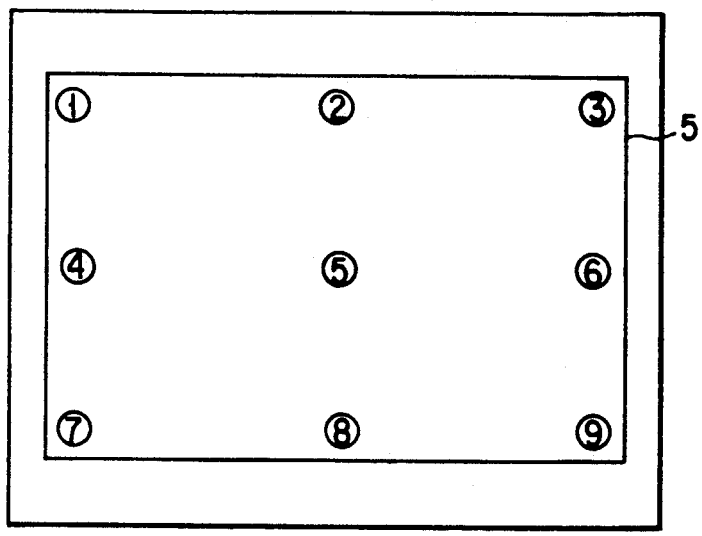
F I G. 13
| | DIFFERENTIAL TEMPERATURE (°C) | |
|---|---|---|
| | CASE 1 | CASE 2 |
| ① - ④ | 0.8 | 1.0 |
| ⑦ - ④ | 2.5 | -0.7 |
| ② - ⑤ | 1.6 | 0.7 |
| ⑧ - ⑤ | 6.1 | 0.6 |
| ③ - ⑥ | 2.1 | 1.1 |
| ⑨ - ⑥ | 3.8 | 0.3 |
F I G. 15

| MEASUREMENT POSITION | TEMPERATURE (°C) | |
|---|---|---|
| | CASE 1 | CASE 2 |
| ① | 32.9 | 32.5 |
| ② | 31.0 | 31.4 |
| ③ | 32.5 | 31.5 |
| ④ | 32.1 | 31.5 |
| ⑤ | 29.4 | 30.7 |
| ⑥ | 30.4 | 30.4 |
| ⑦ | 34.6 | 30.8 |
| ⑧ | 35.5 | 31.3 |
| ⑨ | 34.2 | 30.7 |
| AIR TEMPERATURE | 26.9 | 26.5 |

F I G. 14

LCD WITH HEAT CONDUCTOR FROM LIGHT SOURCE TO SEPARATE PORTION OF LIGHT GUIDE

BACKGROUND OF THE INVENTION

1. Field of the Invention

The present invention relates to an LCD module used as a display device of a data processing apparatus such as a computer, and more specifically, to a back light type LCD module for lighting a display portion by using a light source.

2. Description of the Related Art

Recently, back light type LCD (Liquid Crystal Display) modules are used in many laptop personal computers and wordprocessors. In a back light type LCD module, a difference in lightness between a background of a display surface and an LCD surface is large so that the operator can easily recognize characters and figures on the LCD surface. In general, in an LCD module, light is generated by cold-cathode tubes provided as light sources on side surfaces of the LCD panel. The generated light enters into in a light-guide panel provided at a position opposite to the LCD surface as the display surface of the LCD panel. Light entered in the light-guide plate is uniformly radiated on the entire LCD panel.

In such an LCD module, heat is also generated by the cold-cathode tubes together with light, and display non-uniformity occurs on the LCD surface due to the heat. Display non-uniformity occurs when a threshold voltage for changing the orientation of the liquid crystal of the LCD is changed in accordance with a change in temperature of the liquid crystal. For example, the threshold voltage is low at a high temperature liquid crystal region and is high at a low temperature liquid crystal region.

FIG. 1 shows the structure of the rear portion of the LCD module and its temperature distribution. The temperature decreases in directions indicated by arrows. In an LCD module having a light-guide plate 12 and an LCD panel 15, the closer to cold-cathode tubes 11a and 11b to which the voltage is supplied from a power supply (not shown) via a power line 19, the higher the temperature of the LCD surface because of the heat generated by the cold-cathode tubes 11a and 11b. A portion far from the cold-cathode tubes 11a and 11b has a low temperature as it is not much influenced by the heat generated by the cold-cathode tubes 11a and 11b.

Normally, the LCD module is used at a predetermined angle to face its display surface toward a face of an operator. For example, when the LCD module is placed to face the display surface toward an operator (note that sides 20 and 21 correspond to upper and lower portions, respectively, of the LCD module), the cold-cathode tubes 11a and 11b are located at the lower and upper portions, respectively. Thus, heat generated by the cold-cathode tubes 11a and 11b moves upward, as shown in FIG. 1, because of air convection. Accordingly, high temperature regions are formed near the cold-cathode tubes 11a and 11b, and a low temperature region is formed at a portion higher than the central portion of the LCD panel.

Conventionally, the cold-cathode tubes are arranged at portions farthest from the LCD panel in order to minimize influence of heat generated by the cold-cathode tubes, thereby preventing display non-uniformity. In this case, however, since the whole size of the LCD module is increased, this is not applicable to a small-size data processing apparatus. Further, in order to minimize influence of heat and to prevent display non-uniformity, openings are arranged in a panel cover, thereby dissipating heat generated by the cold-cathode tubes to the outside. However, since convection of air does not occur, degree of display non-uniformity of an LCD panel increases.

From the above situation, an LCD module is demanded in which display non-uniformity caused by heat generated by the cold-cathode tubes can be prevented while the positional relationship between the cold-cathode tubes and the LCD panel is set in the same manner as in the conventional LCD module.

SUMMARY OF THE INVENTION

It is an object of the present invention to provide an LCD module in which display non-uniformity is prevented by making the temperature on the entire surface of the LCD panel uniform.

According to the present invention, there is provided an an LCD module comprising: an LCD panel having a display surface for displaying information; at least one light source provided close to one side of the LCD panel; a light guide plate overlapped to a surface opposite to the display surface of the LCD panel for guiding light generated by the light source to the display surface of the display panel; and heat guide means for guiding heat produced by the light sources to a portion of the light guide plate apart from the light source, to reduce a difference of temperature between portions of the LCD panel which occurs by the heat from the light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a sectional view of the LCD module of FIG. 2 taken along the line AA';

FIG. 7 is a sectional view of the LCD module of FIG. 6 taken along the line CC';

FIG. 8 is a sectional view of the LCD module of FIG. 6 taken along the line DD';

FIG. 9 is a rear view showing the structure of an LCD module according to the fourth embodiment of the present invention;

FIG. 10 is a sectional view of the LCD module of FIG. 9 taken along the line DD';

FIG. 11 is a sectional view of an LCD module according to the fifth embodiment of the present invention;

FIG. 12 is a sectional view of an LCD module according to the sixth embodiment of the present invention;

FIG. 13 shows temperature measurement positions of an LCD panel of an LCD module;

FIG. 14 shows temperatures measured at the temperature measurement positions of the LCD panel shown in FIG. 13; and FIG. 15 shows differential temperatures between two temperature measurement positions of the LCD panel shown in FIG. 13.

DETAILED DESCRIPTION OF THE PREFERRED EMBODIMENTS

The preferred embodiment of the present invention will be described with reference to the accompanying drawings.

Figure 2:
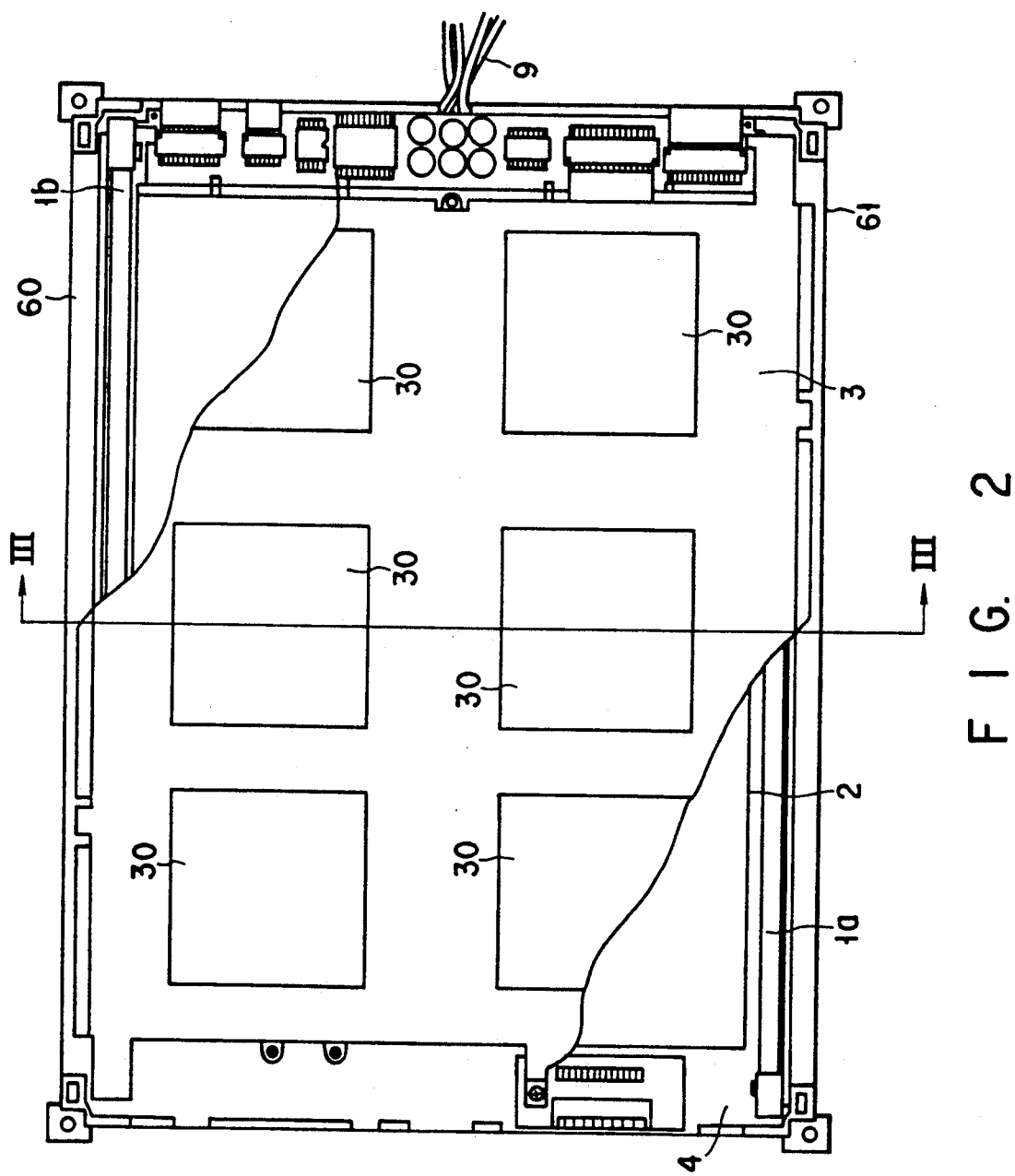
FIG. 2 is a rear view showing the structure of an LCD module according to the first embodiment of the present invention.

FIG. 2 is a rear view showing the structure of an LCD (Liquid Crystal Display) module according to the first embodiment of the present invention, and FIG. 3 is a sectional view of the LCD module of FIG. 2 taken along the line AA'. Referring to FIGS. 2 and 3, the LCD module has cold-cathode tubes 1a and 1b, a light-guide plate 2, a panel cover 3, a module frame 4, an LCD panel 5, a frame cover 6, and a power line 9.

The cold-cathode tubes 1a and 1b are used as light sources for generating light. The light-guide plate 2 receives light generated by the cold-cathode tubes 1a and 1b and radiates it uniformly on the entire surface of the LCD panel 5. Accordingly, the cold-cathode tubes 1a and 1b, and the light-guide plate 2 serve as a back light system.

The panel cover 3 is constituted by, e.g., an aluminum plate to cover the cold-cathode tubes 1a and 1b and the light-guide plate 2. A plurality of openings 30 are formed in the panel cover 3 in order to decrease the weight of the LCD module and to dissipate heat generated by the cold-cathode tubes to the outside. In the present invention, the openings 30 are covered with opening covers 31, as shown in FIG. 3, because the temperature of the entire LCD panel 5 can be made uniform by positively heating the LCD panel 5. Hence, heat generated by the cold-cathode tubes 1a and 1b is not dissipated to the outside. Each opening cover 31 is very lightweight when compared to the panel cover 3, as it is constituted by, e.g., an aluminum or copper tape.

The module frame 4 is used to constitute the outer frame of the LCD module and is covered with the frame cover 6.

The LCD panel 5 displays characters and figures. The operator sees the characters and figures displayed on the LCD panel 5 from a viewing direction 50 shown in FIG. 3.

The power line 9 is used to supply the voltage from a power supply (not shown) to the cold-cathode tubes 1a and 1b.

Normally, the LCD module is used at a predetermined angle to face its display surface toward a face of an operator. For example, in a laptop personal computer, the LCD module is used at an angle close to a right angle and to face its display surface toward a face of an operator. In this use, sides 60 and 61 correspond to upper and lower portions, respectively, of the LCD module. As shown in FIG. 3, the light-guide plate is positioned by the module frame 4 to overlap the LCD panel 5, receives light generated by the cold-cathode tubes 1a and 1b arranged at two sides of the light-guide plate 2, and radiates received light uniformly on the entire LCD panel 5.

Figure 1:
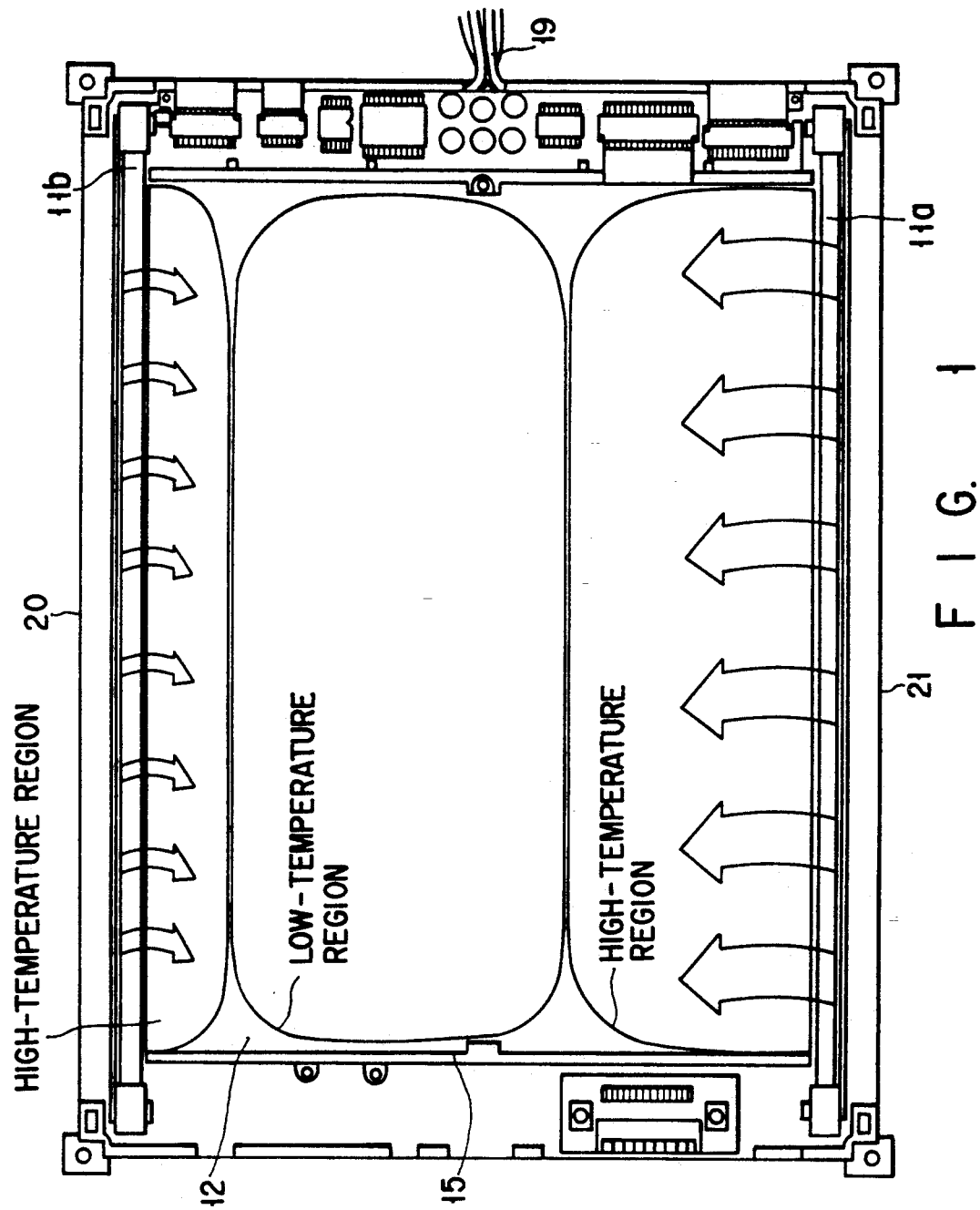
FIG. 1 shows a structure of an LCD module and its temperature distribution.

In a conventional LCD module, when the cold-cathode tubes 11a and 11b and the LCD panel 15 are arranged at positions shown in FIG. 1, heat generated by the cold-cathode tubes 11a and 11b is conducted to the LCD panel 15 through the light-guide plate 12, but temperature non-uniformity occurs in the LCD panel 15. Particularly, in a laptop personal computer, since the LCD module is used at an angle close to the right angle and to face its display surface toward an operator, the high temperature regions are formed close to the cold-cathode tubes 11a and 11b, and the low temperature region is formed at a portion higher than the central portion of the LCD panel 15. The conventional LCD module aims at avoiding an influence of heat generated by the cold-cathode tube. Therefore, in the arrangement shown in FIG. 1, methods are taken to dissipate heat to the outside, by arranging openings in the panel cover 3. In contrast to this, in the first embodiment of the present invention, since heat generated by the cold-cathode tubes 1a and 1b is not dissipated to the outside due to the presence of the panel cover 3 and the opening covers cathode tubes 1a and 1b surrounds the entire light-guide plate 2. In particular, since the low temperature region formed at substantially the central portion of the light-guide plate 2 is heated by air heated by the cold-cathode tube 1a, the light-guide plate 2 has a uniform temperature distribution. Accordingly, if a uniform temperature distribution can be obtained in the light-guide plate 2, a uniform temperature distribution can be obtained in the LCD panel 5 as well, thereby preventing display non-uniformity in the LCD panel 5.

Figure 4:
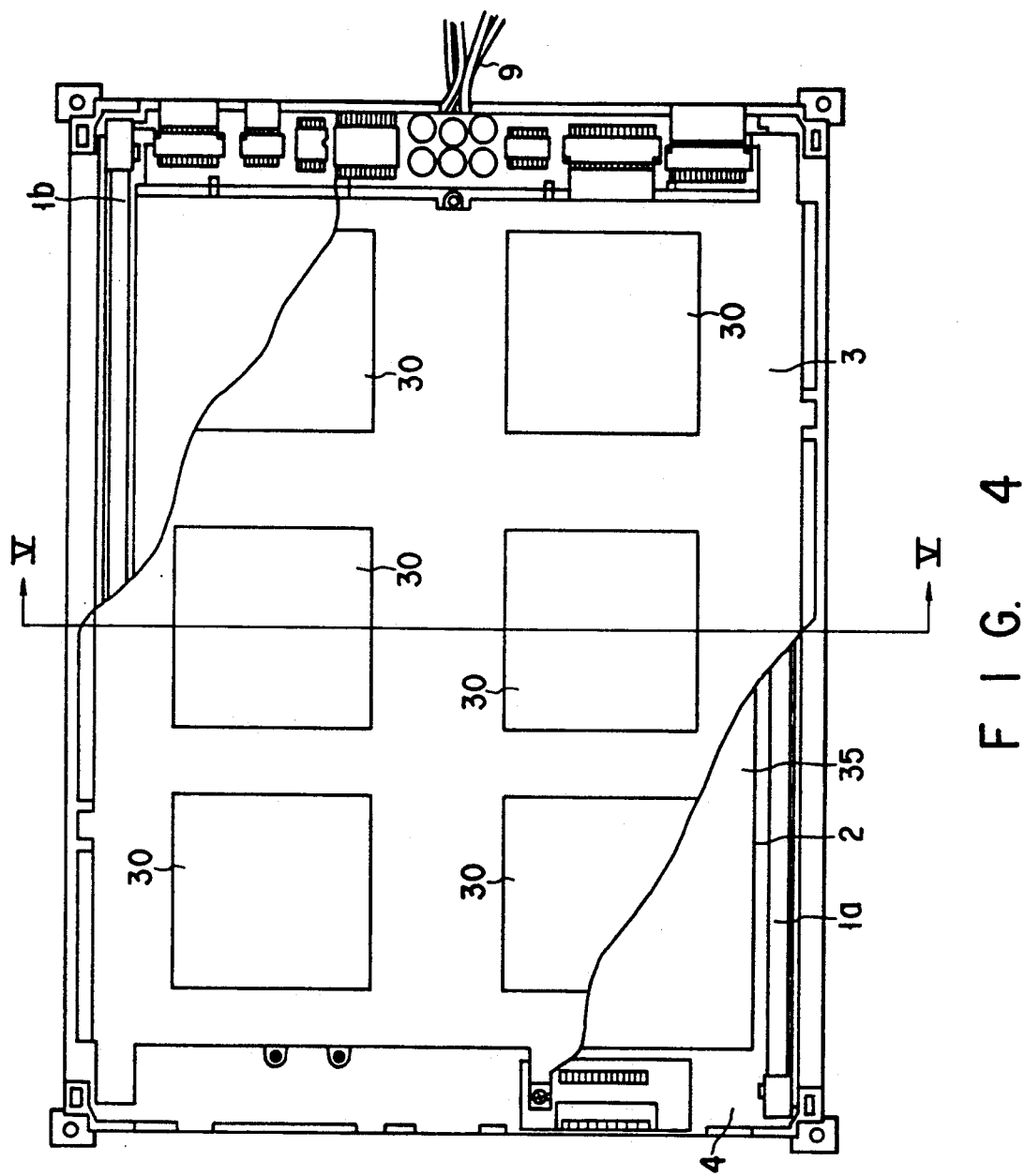
FIG. 4 is a rear view showing the structure of an LCD module according to the second embodiment of the present invention.
Figure 5:
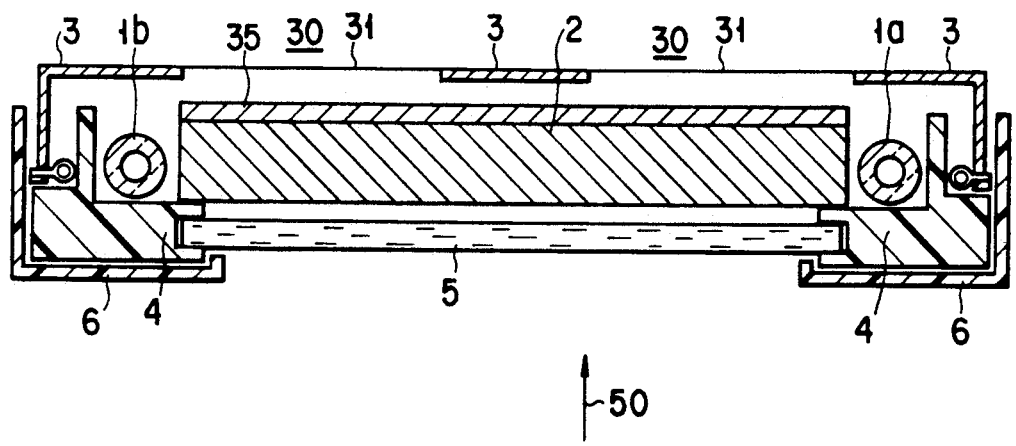
FIG. 5 is a sectional view of the LCD module of FIG. 4 taken along the line BB'.

FIG. 4 is a rear view showing the structure of an LCD module according to the second embodiment of the present invention, and FIG. 5 is a sectional view of the LCD module of FIG. 4 taken along the line BB'. When compared to the LCD module of the first embodiment, the LCD module of the second embodiment further has a heat conducting plate 35. The heat conducting plate 35 can uniformly conduct heat to an LCD panel 5 through a light-guide plate 2 as it contacts the light-guide plate 2, as shown in FIG. 5. The heat conducting plate 35 is constituted by, e.g., a member having a high heat conductivity such as an aluminum or copper plate.

Figure 6:
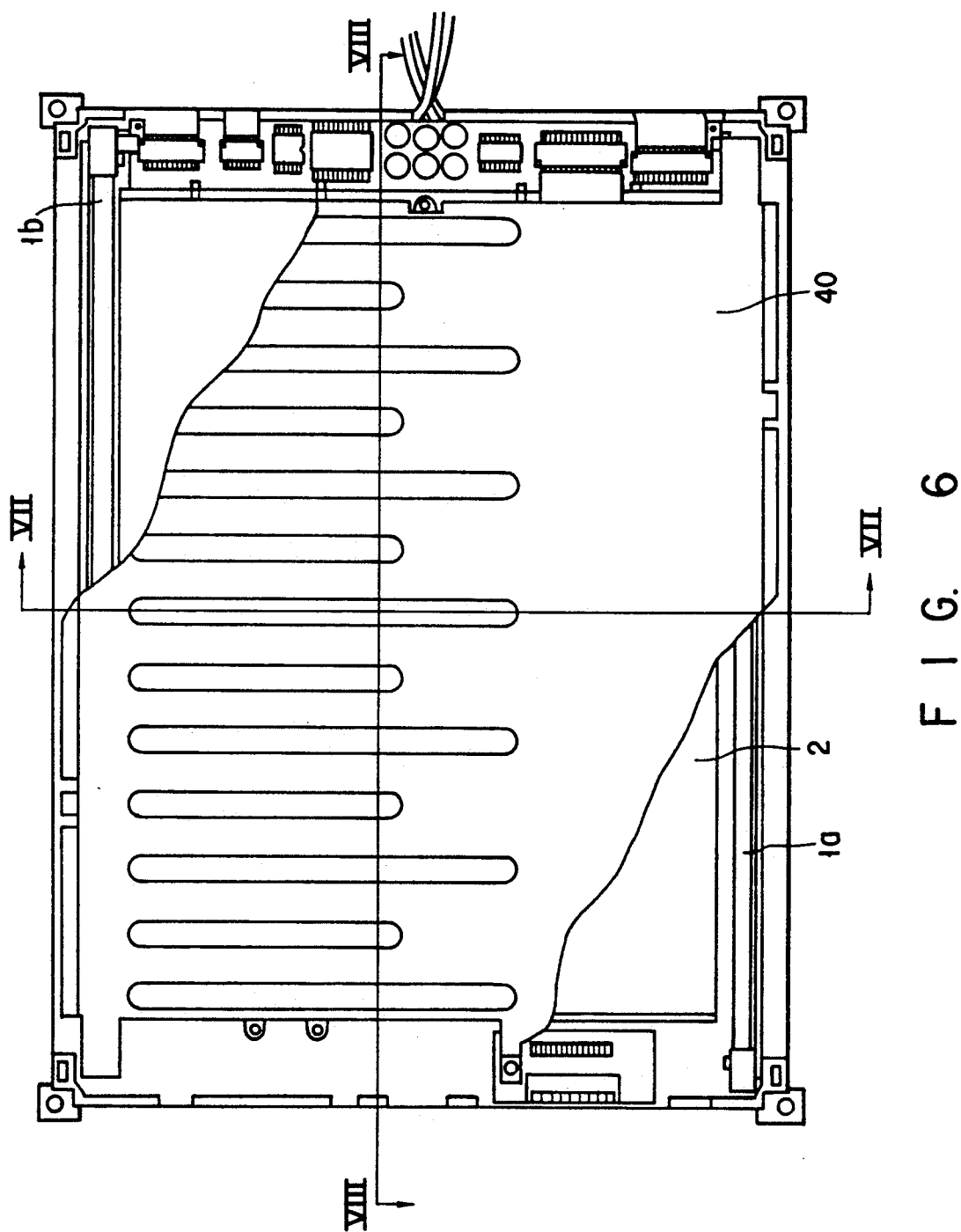
FIG. 6 is a rear view showing the structure of an LCD module according to the third embodiment of the present invention.

FIG. 6 is a rear view showing the structure of an LCD module according to the third embodiment of the present invention, FIG. 7 is a sectional view of the LCD module of FIG. 6 taken along the line CC', and FIG. 8 is a sectional view of the LCD module of FIG. 6 taken along the line DD'. As is apparent from FIGS. 6 to 8, the LCD module according to the third embodiment has a panel cover 40 having a plurality of recessed portions. The panel cover 40 is constituted by, e.g., an aluminum cover as the panel cover 3.

A low temperature region of the light-guide plate 2 contacts the recessed portions of the panel cover 40. Therefore, heat generated by the cold-cathode tubes 1a and 1b is conducted to the low temperature region of the light-guide plate 2 through the panel cover 40. When the LCD module is used at a predetermined angle to face its display surface toward a face of an operator, the low temperature region which is shifted to the upper LCD module is heated by air heated by heat generated by the cold-cathode tube 1a and by directly contacting with the panel cover 3. Thus, the light-guide plate 2 has a uniform temperature distribution by positively leading heat generated by the cold-cathode tubes 1a and 1b to the low temperature region, and the LCD panel 5 can also obtain a uniform temperature distribution. As a result, display non-uniformity in the LCD panel 5 can be prevented.

FIG. 9 is a rear view showing the structure of an LCD module according to the fourth embodiment of the present invention, and FIG. 10 is a sectional view of the LCD module of FIG. 9 taken along the line EE'. When compared to the LCD module of the third embodiment, the LCD module of the fourth embodiment further has a panel cover 45 having a plurality of recessed portions, and heat conducting plates 71 and 72.

The plurality of recessed portions of the panel cover 45 are arranged to contact a low temperature region of a light-guide panel 2. The panel cover 45 is constituted by, e.g., an aluminum plate as the panel 3 or 40.

The heat conducting plate 71 is arranged to contact a cold-cathode tube 1b and the panel cover 45, and the heat conducting plate 72 is arranged to contact a cold-cathode tube 1a and the panel cover 45. The heat conducting plates 71 and 72 are constituted by, e.g., aluminum or copper plates.

Heat generated by the cold-cathode tubes 1a and 1b is conducted to the low temperature region of the light-guide plate 2, passed through the heat conducting plates 71 and 72 and the recessed portions of the panel cover 45. When the LCD module is used at a predetermined angle to face its display surface toward a face of an operator, the low temperature region of the light-guide plate 2 is heated by conducting heat generated by the cold-cathode tube 1a, passed through the heat conducting plates 71 and 72 and the panel cover 45. Thus, the light-guide plate 2 has a uniform temperature distribution, and the LCD panel 5 can also obtain a uniform temperature distribution. As a result, display non-uniformity in the LCD panel 5 can be prevented.

FIG. 11 is a sectional view of an LCD module according to the fifth embodiment of the present invention. When compared to the LCD module of the fourth embodiment, the LCD module of the fifth embodiment further has a heat conducting material 7a. Although a panel cover 47 in FIG. 11 does not have openings, a panel cover 30 having opening covers 31 can be used in place of the panel cover 47.

The heat conducting material 7a is arranged to contact cold-cathode tubes 1a and 1b and a low temperature region of a light-guide plate 2. The heat conducting material 7a is constituted by, e.g., an aluminum or copper tape.

Heat generated by the cold-cathode tubes 1a and 1b is conducted to the low temperature region of the light-guide plate 2 through the heat conducting material 7a. Thus, both the light-guide plate 2 and an LCD panel 5 have uniform temperature distributions, and display non-uniformity in the LCD panel 5 can thus be prevented.

FIG. 12 is a sectional view of an LCD module according to the sixth embodiment of the present invention. When compared to the LCD module of the fifth embodiment, the LCD module of the sixth embodiment has a heat generating member 8 in place of the heat conducting material 7a.

The heat generating member 8 is constituted by a glass plate having a heat conducting wire 8a and is arranged to contact with a low temperature region of a light-guide plate 2.

The heat generating member 8 generates heat upon reception of a current supplied from a power supply. Since this heat is directly conducted to the low temperature region of the light-guide plate 2, the light-guide plate 2 and an LCD panel 5 can have uniform temperature distributions. As a result, display non-uniformity in the LCD panel 5 can be prevented.

FIG. 13 shows temperature measurement positions of an LCD panel of an LCD module, FIG. 14 shows measured temperatures at the temperature measurement positions of the LCD panel shown in FIG. 13, and FIG. 15 shows differential temperatures between two temperature measurement positions of the LCD panel shown in FIG. 13. Referring to FIGS. 14 and 15, in case 1, the LCD module of FIG. 3 is used but the openings 30 are open and not covered with the opening covers 31, and in case 2, the LCD module as shown in FIG. 5 is used. Referring to FIG. 13, although not shown, cold-cathode tubes are arranged at upper and lower portions of the LCD panel, i.e., on a side including temperature measurement positions ①, ②, and ③, and a side including temperature measurement positions ⑦, ⑧, and ⑨.

As is apparent from FIGS. 14 and 15, in case 1, the temperature distribution of the respective measurement positions is non-uniform, and the maximum differential temperature between a measurement position close to a cold-cathode tube and a central measurement position of the LCD panel is about 6° C. In case 2, the temperature distribution of the respective measurement positions is rather uniform, when compared to case 1, and the maximum differential temperature difference between a measurement position close to a cold-cathode tube and a central measurement position of the LCD panel 5 is about 1° C.

As described above, in order to prevent an influence of heat generated by the cold-cathode tubes, a method of dissipating heat is conventionally employed. In contrast to this, according to this embodiment, a method of making the temperature distribution of the LCD panel uniform by positively utilizing heat generated by the cold-cathode tube is employed. As a result, display non-uniformity of the LCD panel can be effectively prevented.

Preferred embodiments of the present invention have been described above. The present invention is not limited to the above embodiments but various changes and modifications may be made without departing from the spirit and scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An LCD module comprising:

an LCD panel having a display surface for displaying information;

a light source provided close to one side of the LCD panel;

a light guide plate, provided adjacent to a surface opposite to the display surface of the LCD panel, for guiding light generated by the light source to the display surface of the LCD panel;

a heat conducting plate in contact with a selected portion of said light guide plate preferentially guiding heat generated by the light source to said selected portion of said light guide plate to provide a uniform temperature distribution across the LCD panel, said selected portion being spaced from said light source; and covering means for covering both the light guide plate and the heat conducting plate and for preventing heat generated by the light source from dissipating.

2. The LCD module according to claim 1, wherein the heat conducting plate comprises a member having a high heat conductivity, such as an aluminum or copper plate.

3. The LCD module according to claim 1, wherein the covering means covers the light source and the light guide plate.

4. The LCD module according to claim 1, further comprising:

a second heat conducting plate which is in contact with both the light source and the light guide plate.

5. An LCD module comprising:

an LCD panel having a display surface for displaying information;

a light source provided close to one side of the LCD panel;

a light guide plate, provided adjacent to a surface opposite to the display surface of the LCD panel, for guiding light generated by the light source to the display surface of the LCD panel; and covering means for covering the light guide plate and the light source, said covering means having a portion in contact with a selected portion of the light guide plate preferentially guiding heat generated by the light source to said selected portion of the light guide plate to provide a uniform temperature distribution across the LCD panel, said selected portion being spaced from said light source.

6. The LCD module according to claim 5, wherein said portion of said covering means in contact with said light guide plate includes one or more recessed portions sufficiently recessed to contact the light guide plate.

7. The LCD module according to claim 5, further comprising:

a heat conducting plate which is in contact with both the light source and the covering means.

8. An LCD module comprising:

an LCD panel having a display surface for displaying information;

a light source provided close to one side of the LCD panel;

a light guide plate, provided adjacent to a surface opposite to the display surface of the LCD panel, for guiding light generated by the light source to the display surface of the LCD panel;

heat generating means adjacent to a selected portion of the light guide plate to preferentially heat the selected portion of the light guide plate to provide a uniform temperature distribution across the LCD panel, said selected portion being spaced from said light source; and covering means for covering the light guide plate, the light source and the heat generating means, and for preventing heat generated by the light source from dissipating.

9. The LCD according to claim 8, wherein the heating generating means is constituted by a glass plate, said glass plate having a heat conducting wire which is in contact with the light guide plate.

* * * * *

UNITED STATES PATENT AND TRADEMARK OFFICE
CERTIFICATE OF CORRECTION

PATENT NO. : 5,299,038
DATED : March 29, 1994
INVENTOR(S) : Hiroshi Hamada et al.

It is certified that error appears in the above-indentified patent and that said Letters Patent is hereby corrected as shown below:

In the Abstract, line 4, after "plate" insert --.--.

Signed and Sealed this

Twentieth Day of December, 1994

Attest:

BRUCE LEHMAN

Attesting Officer     Commissioner of Patents and Trademarks